United States Patent [19]

Tangorra et al.

[11] Patent Number: 4,553,952
[45] Date of Patent: Nov. 19, 1985

[54] TOOTHED-BELT AND TOOTHED-PULLEY TRANSMISSION

[75] Inventors: Giorgio Tangorra, Monza; Mario Cicognani, Milan; Vincenzo Macchiarulo, Chieti, all of Italy

[73] Assignee: Industrie Pirelli S.p.A., Milan, Italy

[21] Appl. No.: 467,793

[22] Filed: Feb. 18, 1983

[30] Foreign Application Priority Data

Feb. 26, 1982 [IT] Italy ................ 19873 A/82

[51] Int. Cl.⁴ .................. F16G 1/28; F16H 55/30
[52] U.S. Cl. ..................... 474/153; 474/205
[58] Field of Search .................. 474/153, 205

[56] References Cited

U.S. PATENT DOCUMENTS

| | | | |
|---|---|---|---|
| 2,988,925 | 6/1961 | Sauer | 474/205 |
| 3,996,812 | 12/1976 | Cappotto et al. | 474/153 |
| 4,108,011 | 8/1978 | Gregg et al. | 474/153 |
| 4,427,403 | 1/1984 | Kanamori et al. | 474/153 |

FOREIGN PATENT DOCUMENTS 3035957  5/1982  Fed. Rep. of Germany ...... 474/153

Primary Examiner—Stephen J. Novosad
Assistant Examiner—Bruce M. Kisliuk
Attorney, Agent, or Firm—Stevens, Davis, Miller & Mosher

[57] ABSTRACT

A toothed-belt and toothed-pulleys transmission including means for widening the teeth of the toothed-belt, said means corresponding to the top of each belt tooth and the base of each toothed-pulley groove.

8 Claims, 7 Drawing Figures ns. Specifically, a transmis-
TOOTHED-BELT AND TOOTHED-PULLEY TRANSMISSION

BACKGROUND OF THE INVENTION

1. Field of the Invention

The present invention concerns a toothed-belt and toothed-pulleys transmission. Specifically, a transmission comprising at least two pulleys, one driving and the other driven, provided on their surface of revolution with a toothing, and a toothed-belt fitted over the two pulleys in such a way that the toothing of the belt meshes with the toothing of the pulleys, so that the movement from the driving pulley is transmitted to the driven pulley.

2. Prior Art

There are many types of toothed-belt and toothed-pulley transmissions that are already known. In the previously known toothed-belt and toothed-pulley transmissions, the transmission of the movement takes place through the meshing of the teeth of the toothed-belt with the teeth of the toothed-pulley in the same manner in which the transmission of motion takes place between gearings. Now, the present invention makes available a toothed-belt comprising a ring of elastomeric or similar material, in which is embodied a resistant-to-traction structure formed by a plurality of flexible and inextensible cords that are parallel to and co-planar with one another, that is provided, on one side of the ring, with a toothing comprising a plurality of teeth which are also made of elastomeric or similar material.

The toothed-belt and toothed-pulleys transmissions seen in the prior art are characterized by the presence of one element, namely the toothed-belt, which is made of an elastomeric material and is consequently elastically deformable, and other elements, namely the toothed-pulleys, which are made of a rigid material such as, for example, various types of metals or metal alloys. Various drawbacks, such as excessive wear of the toothed-belt teeth, high consumption of power during the transmission which lowers the transmission efficiency, and the presence of vibrations in the belt transmission which shortens the belt's service life, arise with the use of the prior art toothed-belt and toothed-pulleys transmissions.

Many solutions have been proposed in an attempt to eliminate the above-cited drawbacks. However, a truly satisfactory solution for the problems existing in the prior art toothedbelt and toothed-pulleys transmissions has not previously been available.

SUMMARY OF THE INVENTION

A princial object of the present invention is to solve the problems that exist in the prior art toothed-belt and toothed-pulleys transmissions, by eliminating the above cited drawbacks.

A further object of the present invention is the provision of a toothed-belt and toothed-pulleys transmission wherein the toothed-belt comprises an annular body of an elastomeric material, in which is embedded a tension-resistant structure, and a plurality of teeth. The belt teeth are also made from an elastomeric material, and are cantilevered from one side of the annular body and separated from one another by grooves. The belt teeth are designed so as to be inserted into the groove portions of the pulleys' toothing, the belt teeth being characterized by the fact that they include a means for widening the bodies of the teeth, said means being interposed between the tops of the belt teeth and the bottoms of the pulley groove portions.

Yet another object of the present invention is the toothed-belt in itself and the toothed-pulleys in themselves, independently of their reciprocal coupling together for the formation of a transmission.

BRIEF DESCRIPTION OF THE DRAWINGS

The present invention will be better understood from the following detailed description, made solely for the purpose of providing a non-limiting example, with reference to the figures of the attached drawing, wherein.

DESCRIPTION OF THE PREFERRED EMBODIMENT

According to the most general concept of the present invention, a toothed-belt and toothed-pulleys transmission is provided which includes a means for widening the body of each of the belt teeth, said means being interposed between the top of the teeth of the toothed-belt and the bottom of the grooves of the toothed-pulleys. Moreover, the above-mentioned "widening means" are preferably also supporting means, for resting and centering each tooth of the toothed-belt inside the grooves of the toothed-pulley.

Figure 1:
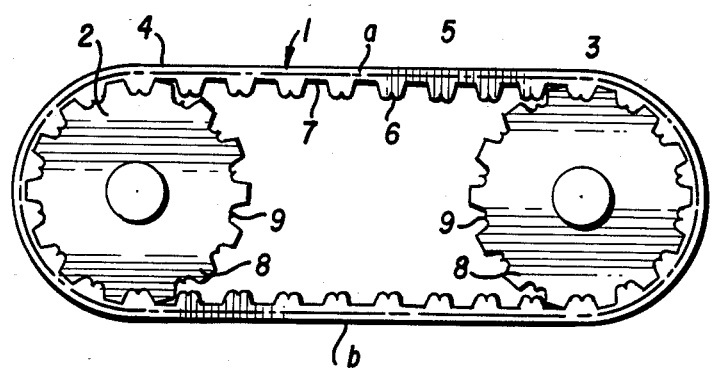
FIG. 1 shows a lateral view of a toothed-belt and toothed-pulleys transmission according to the invention.

In FIG. 1, there is represented a toothed-belt and toothed-pulleys transmission according to the present invention. As can be seen in FIG. 1, the transmission comprises a toothed-belt 1, and two toothed-pulleys 2 and 3 of which one is the driving toothed-pulley, while the other is the driven toothed-pulley. More particularly, the toothed-belt 1 is formed by an annular body of an elastomeric of similar type material, in which is embedded a tension-resistant structure comprising a plurality of flexible and inextensible cords 5 which are parallel and coplanar to each other and are disposed along the greater dimension of the toothed-belt. These cords may be made of, for example, fiberglass, aliphatic or aromatic polyamides, steel or similar materials.

On one side of the annular body 4, there is present a toothing of elastomeric or similar type material. Said toothing comprises a plurality of teeth 6, the teeth being separated from one another by grooves 7. The surfaces of the teeth and the grooves of the toothed-belt are preferably clad with a covering, and in particular with a fabric type covering, especially a self-lubricating fabric such as the one set out in Applicant's Italian Pat. No. 864204. The toothed-pulleys 2 and 3 are made of a metallic material, or generally speaking, of a material which is rigid in comparison with the material constituting the toothed-belt 1. These toothed-pulleys have, on their surface of revoultion, a toothing formed by a plurality of teeth 8 separated by grooves 9.

Figure 2:
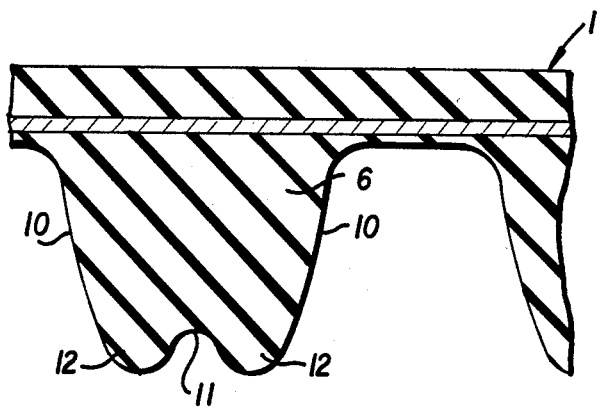
FIG. 2 shows a cross-section of a tract of a toothed-belt in a transmission according to the invention.
Figure 3:
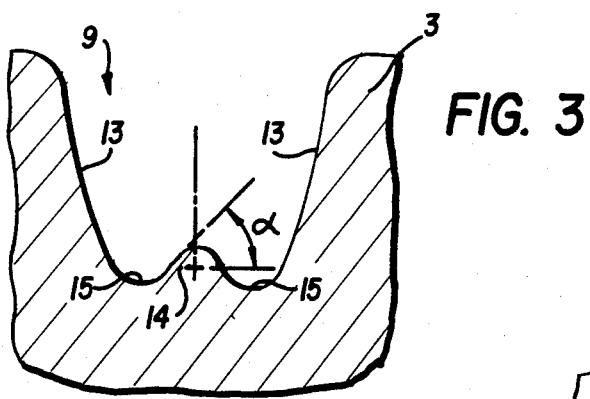
FIG. 3 shows a cross-section of a tract of a toothed-pulley in a transmission according to the invention, apt for being coupled with the toothed-belt shwon in FIG. 2.

Shown in FIGS. 2 and 3, in enlarged dimensions, are a tract of a toothed-belt and a tract of a toothed-pulley, respectively, of the transmission shown in FIG. 1. These figures illustrate the characteristics of the toothed-pulley and the toothed-belt when they are not engaged with each other. More particularly, in FIG. 2 there is shown, in enlarged dimension, a tract of the toothed-belt 1 of the transmission shown in FIG. 1, when it is not engaged with the toothed-pulleys of the transmission itself. As can be seen in FIG. 2, the toothed-belt 1 has teeth 6, the sides 10 of which can have any profile whatsoever, and the tops of which present a slot 11 that originates two protuberances 12. The specific characteristics of the slot are described in more detail below.

In FIG. 3 there is shown, in enlarged dimension, a tract of one of the toothed-pulleys 2 or 3 of the transmission illustrated in FIG. 1, in other words, a tract of the toothed-pulley apt for meshing with the toothed-belt shown in FIG. 2. As can be seen in FIG. 3, the toothed-pulley has grooves 9, the sides 13 of which can have any profile whatsoever, and hence, a profile that need not necessarily be the same as the profile of the sides 10 of the toothed-belt that is to be coupled with it. The base of the groove 9 presents protuberance 14 that originates two slots 15 on its sides.

The combination of the slot 11, present on the top of the teeth 10 of the toothed-belt 1, and the protuberance 14, found present in cantilever fashion on the bottom of groove 9 of the toothed-pulleys 2 and 3, comprises the means for widening the teeth of the toothed-belt. The widening means being interposed between the tops of the teeth of the toothed-belt and the bottoms of the grooves of the toothed-pulleys. In order to properly function as a widening means, the slot 11 and the protuberance 14 possess the following characteristics.

First and foremost, the depth of the slot 11 on the top of a tooth 6 of the toothed-belt, measured between its bottom and the summit of the protuberance 12, must be equal to the height of the protuberance 14 present on the bottom of the groove of the toothed-pulley, the height of the protuberance 14 being measured between the summit of said protuberance 14 and the bottom of the slots 15. Second, the width of the slot 11 present on the top of the tooth 6 of the toothed-belt must be less than the width of the protuberance 14 present in cantilever fashion on the bottom of the groove 9 of the pulley toothing. Third, the tangents at the surface of the sides of the protuberance 14, or at least of one part of the sides of the protuberance 14, must form with the perpendicular to the radius of the pulley at the tangential point, an angle α, the value of which is greater than the value of the sliding friction angle, i.e., the angle at which a body at rest on an inclined surface will begin to slip, existing between the surfaces of the toothed-belt's teeth and the surfaces of the toothed-pulleys' teeth.

As for other general characteristics, such as the possible geometrical configurations of the slot present at the top of the belt teeth as well as of the protuberance cantilevered from the bottom of the grooves of the toothed-pulley, said geometrical configurations can be of any type whatsoever, provided that the above-cited conditions are observed. In summary, the volume of the space constituting the groove 9 of a toothed-pulley, must be substantially equal to the volume of the tooth of the toothed-belt destined to be engaged with it.

Figure 4:
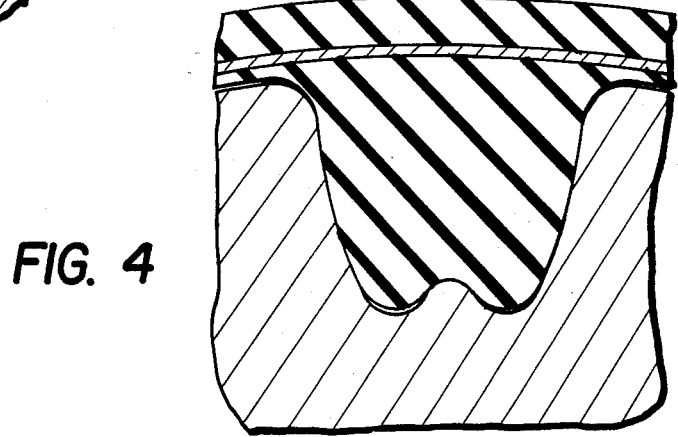
FIG. 4 shows a cross-section of a tract of a transmission according to the invention, with the toothed-belt of FIG. 2 coupled with the toothed-pulley of FIG. 3.

The functioning of a toothed-belt and a toothed-pulleys transmission such as that shown in FIG. 1, will now be described, not only with reference to FIGS. 2 and 3 which represent, respectively, a tract of a toothed-belt and a portion of a toothed-pulley that can be coupled together (but which are not shown coupled), but also with reference to FIG. 4, in which a tract of a toothed-belt coupled with a toothed-pulley is represented. As can be seen in FIG. 1, the toothed-belt is fitted over and subtended on the two toothed-pulleys 2 and 3, and embraces part of the contour of the toothed-pulleys, thereby forming two rectilineal branchs, one upper a and one lower b. In the tracts in which the toothed-belt embraces the toothed-pulleys, the teeth of the toothed-belt are lodged in the grooves of the toothed-pulleys, the arrangement in these tracts being the one represented in FIGS. 1 and 4. In contrast, in the tracts of the transmission wherein there is no existing contact between toothed-belt and toothed-pulleys, the teeth of the toothed-belt have the configuration shown in FIG. 2.

As previously stated, one of the two toothed-pulleys (for example, the pulley 3) is a driving-pulley, while the other (for example, the pulley 2) is a driven-pulley. During the movement of the driving-pulley, for example, in the clockwise direction for an observer looking at FIG. 1, said driving-pulley draws the toothed-belt into movement due to the thrust exerted by the teeth of the driving toothed-pulley on the teeth of the toothed-belt. Consequently, with its movement, the toothed-belt draws into motion the driven toothed-pulley by means of the thrust-action exerted by the teeth of the toothed-belt on the teeth of the driven toothed-pulley. During this movement, the teeth of the toothed-belt which are found in the upper branch a of the belt, penetrate, one after the other, into the grooves 9 of the driving toothed-pulley, so that they eventually correspond to the lower branch b of the toothed-belt. Similarly, the teeth present in the lower branch b of the tooth-belt penetrate successively into the grooves of the toothing of the driven toothed-pulley, thereby exerting a driving thrust on said driven pulley and then leave said driven toothed-pulley so that they eventually correspond to the upper branch a of the toothed-belt.

The teeth of the toothed-belt, as stated above, penetrate into the grooves of the toothed-pulleys, momentarily stay inside said grooves of the toothed-pulleys, and then issue forth from said grooves of the toothed-pulleys. The mechanics of the insertion of the teeth of the toothed-belt into the grooves of the toothing of the toothed-pulleys takes place with the following modality. One tooth of the toothed-belt penetrates inside one groove of the toothed-pulley, without allowing any sliding to occur between the side of the belt tooth and the side of the pulley tooth. In other words, the belt tooth does not slide on the surface of the pulley grooves. The first contact that occurs, between a tooth of the toothed-pulley and the groove of the toothed-pulley, takes place between the sides of the protuberance cantilevered from the bottom of the groove of the toothed pulley and the sides of the slot 11 corresponding to the top of the tooth of the toothed-belt. Since the width of the protuberance 14 cantilevered from the bottom of the groove 9 of the toothed pulley is greater than the width of the slot 11 present on the top of the tooth 6 of the toothed-belt, a widening of the tooth-body of the toothed-belt occurs once the tooth body is inside the groove of the toothed-pulley. This widening brings about a deformation of a tooth of the toothed-belt such that it is forced to enlarge, thereby bringing into contact practically the entire surface of the tooth of the toothed-belt with the entire surface of the groove of the toothed-pulley. This contact can occur without putting the tooth of the toothed-belt under compression, since the height of the protuberance 14 is equal to the depth of the slot 11. Thus, no stresses are caused in the perpendicular direction of the tension-resistant insert 5 of the toothed-belt.

Figure 5:
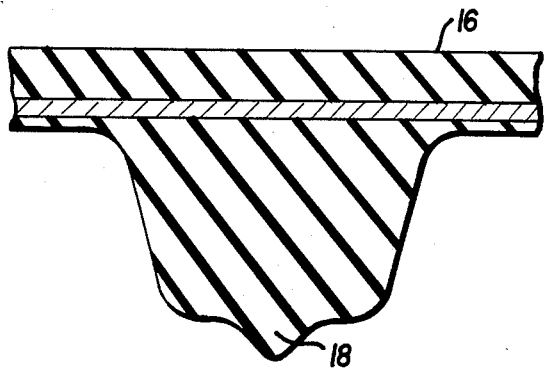
FIG. 5 shows a cross-section of a tract of a toothed-belt in one alternative embodiment of a transmission according to the present invention.
Figure 6:
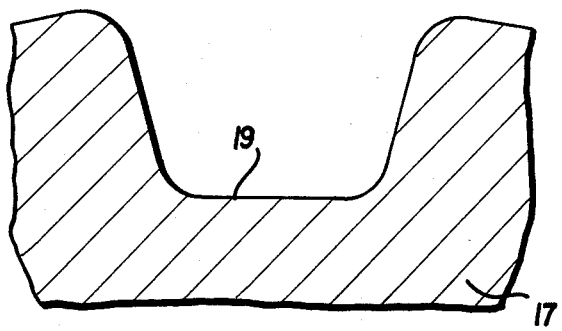
FIG. 6 shows a cross-section of a tract of a toothed-pulley, in an alternative embodiment of a transmission according to the invention, apt for coupling with the toothed-belt of FIG. 5.
Figure 7:
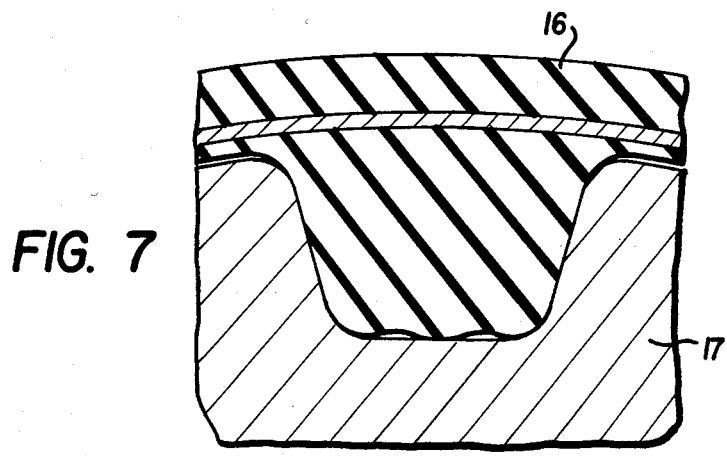
FIG. 7 shows a cross-section of a tract of the toothed-belt of FIG. 5, and a tract of a toothed-pulley of FIG. 6, coupled with one another in a transmission.

In FIGS. 5, 6 and 7, there is shown an alternative embodiment of the toothed-belt and toothed-pulleys transmission according to the present invention. More precisely, these figures show portions of a toothed-belt and of the corresponding toothed-pulley in an alternative embodiment of a transmission according to the present invention. As is seen in FIGS. 5, 6 and 7, the toothed-belt 16 and the corresponding toothed pulley 17 differ from those shown in FIGS. 2, 3 and 4, due to the fact that the toothed-belt 16 presents, corresponding to the top of each of its teeth, at least one cantilevered protuberance 18, while the toothed-pulley presents a bottom 19 of the groove 16 which is perfectly smooth. However, the volume of the entire body of one belt tooth is still equal to the volume of a groove of the toothing of the toothed-pulleys.

In this embodiment, the widening means for the body of the teeth of the toothed-belt consist of the presence of the protuberance 18 cantilevered from the top of each tooth of the toothed-belt and of the fact that the bottom of the grooves of the pulley's toothing is smooth.

During the functioning of a toothed-belt and toothed-pulleys transmission corresponding to the alternative embodiment shown in FIGS. 5, 6 and 7, it is seen that each tooth of the toothed-belt penetrates into a groove of the toothed-pulley's toothing without any slipping taking place between the sides of the tooth of the toothed-belt and the sides of the grooves of the toothed-pulleys. Thus, the first contact between a tooth of the toothed-belt and the surface of the groove of the toothed-pulley takes place when the protuberance 18 present in the top of the belt tooth contacts the bottom of the groove of the toothed-pulley. When the insertion of a tooth of the toothed-belt into the groove of the toothed-pulley's toothing is continued, a squeezing of the protuberance 18 occurs so that the protuberance 18 becomes wedged into the body of the tooth of the toothed-belt, which consequently causes a widening of the tooth body. In this manner, the entire surface of a tooth of the toothed-belt comes into complete contact with the entire surface of a groove of the toothed-pulley, as shown in FIG. 7.

According to another alternative embodiment of a transmission according to the present invention, each tooth of the toothed-belt has a protuberance cantilevered from its own top, while at the bottom of each groove of the toothed-pulley a housing-slot for said protuberance of the belt-tooth is present. In this instance, however, the height of the protuberance cantilevered from the top of a tooth of the toothed-belt must be greater than the depth of the slot present at the bottom of the groove of the toothed-pulley.

From the above description it can be understood that, with a toothed-belt and toothed-pulleys transmission according to the present invention, the proposed objects of the invention are achieved. The elimination of frictional sliding between the teeth of the toothed-belt and the teeth of the toothed-pulley eliminates or substantially reduces the wearing-out of the teeth of the toothed-belt. This reduction in wear results in a longer service life for the toothed-belt and, consequently, for the transmission itself. Moreover, the widening of the teeth of the toothed-belt, after the insertion of a tooth into the groove of the toothed-pulley, eliminates all of the phenomenon seen in the prior art involving the settling of a toothed-belt tooth into a toothed-pulley groove. In fact, the widening of the tooth-body (of the toothed-belt) allows for the elimination of all the clearances that are necessarily present in the previously known toothed-belt and toothed-pulleys transmissions. The presence of these clearances, associated along with the factors cited herebelow, leads to problems with the toothed-belt and toothed-pulleys transmissions seen in the prior art, such as relative movement and settlings between the toothed-belts teeth and the toothed-pulleys' grooves. The above-mentioned factors are as follows:

(a) relative variation of position between the toothed-belt tooth and the groove of the toothed-pulley that receives it, during the functioning of the transmission;

(b) intrinsic deformability of the elastomeric material constituting the teeth of the toothed-belt; and (c) variation of load applied to a toothed-belt tooth housed in a groove of a toothed-pulley, during the functioning of a transmission.

These relative movements and settlings cause increased wear on the transmission and, consequently, a decreased useful life for the transmission.

In contrast, in a transmission according to the present invention, the elimination of the clearances between the toothed-belt teeth and the grooves of the toothed-pulleys into which the teeth are inserted causes the settlings and relative movements to be eliminated. A further aspect of the present invention which helps to eliminate the settlings is the presence of the widening means consisting of the protuberance cantilevered from the bottom of the grooves of the toothed-pulleys' toothing and the slots present in the top of the toothed-belt's teeth. This coupling, between the protuberance and the slots (of the grooves and of the teeth), opposes any relative movements which could otherwise occur between the teeth of the belt and the grooves of the pulleys.

Moreover, the coupling just described also performs the function of maintaining a perfect centering of the toothed-belt's tooth inside the toothed-pulley's groove, so as to avoid any micro-displacements which might otherwise occur between the belt-teeth and the belt-body due to the inherent deformability of the elastomeric material used for the belt. This centering function of the couplings also ensures the absolute positiveness of the transmission by eliminating any micro-displacements between the toothing of the toothed-belt and the toothing of the toothed-pulleys and consequently by eliminating the production of any vibrations in the transmission.

An additional positive effect attributable to the coupling of the protuberance cantilevered from the bottom of the grooves of the pulleys with the slots present in the tops of the teeth of the toothed-belt, is that of providing a more uniform distribution of the loads applied to all the teeth of a toothed-belt which are simultaneously in mesh with a toothed-pulley. The significance of this effect is the fact that a reduction of the load applied to each tooth of the toothed-belt is obtained. As a result, it is possible to increase the power transmissible, while at the same time diminishing the risk that the so-called "tooth-skipping" phenomenon will occur.

Moreover, the presence of the coupling between the protuberance cantilevered from the bottom of the grooves of the toothed-belt's toothing and the slot present in the tops of the teeth of the toothed-belt prevents any localized flexional stresses from arising in the tension-resistant insert embedded in the body of the toothed-belt. This positive effect of the coupling represents the elimination of yet another cause that gives rise to vibrations occurring in the transmission, and promotes a greater uniformity of the stresses on the tension-resistant insert of the belt. The coupling, between the protuberance cantilevered from the bottom of the grooves of the toothed-pulleys and the slot present in the tops of the teeth of the toothed-belt, enables moreover, the tooth of the toothed-belt to have a support inside the groove of the toothed-pulley. In other words, it allows the height of the tooth to be raised and allows the amount of power transmissible with the transmission to be increased, while at the same time causing the elastomeric material of the tooth to more efficiently bear the stresses that are imparted to it.

Finally, the transmission according to the present invention has as another advantage the fact that it is less noisy during operation. This decrease in noise is due to the fact that during the engagement that takes place when the teeth of the toothed-belt are inserted into the grooves of the toothed-pulleys, the impact that necessarily occurs during the contact is gradual in nature. The impact is gradual in nature since the first contact takes place along two lines and on a shock-absorbing element constituted by the slot present on the top of the toothed-belt's tooth which enlarges elastically on engaging with the protuberance cantilevered from the bottom of the groove of the toothed-pulleys. In this manner, the air present in the contact zone between the belt-teeth and the pulley-grooves can freely escape the grooves of the pulleys without causing any emission noises and/or vibrations.

Although there have been illustrated and described herein some embodiments according to the present invention, what are also intended as being comprised within the present invention are all those possible variations of the inventive principle which are accessible to a technician of the field.

What is claimed is:

1. A toothed-belt and toothed-pulleys transmission, comprising:
   a toothed-belt comprising an annular body of elastomeric material having a tension-resistant structure embedded therein;
   a plurality of deformable teeth formed from an elastomeric material, said teeth being cantilevered from one side of the annular body and having a body comprising side, top and bottom portions;
   a plurality of grooves separating the individual teeth of said plurality of deformable teeth from one another;
   a plurality of toothed-pulleys, said toothed-pulleys having a plurality of rigid teeth formed from a rigid material, said toothed-pulleys being further characterized by the presence of a plurality of grooves which separate the individual teeth of said plurality of rigid teeth, said grooves having bottom and side portions;
   means for widening the bodies of the deformable teeth of the toothed-belt, said means being interposed between the tops of the deformable teeth of the toothed-belt and the bottom portion of the pulley grooves; said means for widening the bodies of the deformable teeth of the toothed-belt comprising at least one slot corresponding to the top of each tooth and at least one protuberance cantilevered from the bottom portion of the grooves of the toothed-pulleys' toothing, said protuberance being wedgeable into said slot.

2. A toothed-belt and toothed-pulleys transmission, comprising:
   a toothed-belt comprising an annular body of elastomeric material having a tension-resistant structure embedded therein;
   a plurality of deformable teeth formed from an elastomeric material, said teeth being cantilevered from one side of the annular body and having a body comprising side, top and bottom portions;
   a plurality of grooves separating the individual teeth of said plurality of deformable teeth from one another;
   a plurality of toothed-pulleys, said toothed-pulleys having a plurality of rigid teeth formed from a rigid material, said toothed-pulleys being further characterized by the presence of a plurality of grooves which separate the individual teeth of said plurality of rigid teeth, said grooves having bottom and side portions;
   means for widening the bodies of the deformable teeth of the toothed-belt, said means being interposed between the tops of the deformable teeth of the toothed-belt and the bottom portion of the pulley grooves; said means for widening the bodies of the deformable teeth of the toothed-belt comprising at least one slot corresponding to the top of each tooth and at least one protuberance cantilevered from the bottom portion of the grooves of the toothed-pulleys' toothing, said protuberance being wedgeable into said slot; and
   the protuberance cantilevered from the bottom of the groove portion of the toothed-pulleys' toothing having a height equal to the depth of the slot present in the top of each tooth of the toothed-belt, a width of a portion of said protuberance being greater than a width of a mating portion of said slot with which said protuberance engages when wedged into said slot, said width of said protuberance being defined relative to a radial dimension of said toothed-pulley and said width of said slot being defined relative to a longitudinal dimension of said toothed-belt.

3. A toothed-belt and toothed-pulleys transmission, comprising:
   a toothed-belt comprising an annular body of elastomeric material having a tension-resistant structure embedded therein;
   a plurality of deformable teeth formed from an elastomeric material, said teeth being cantilevered from one side of the annular body and having a body comprising side, top and bottom portions;
   a plurality of grooves separating the individual teeth of said plurality of deformable teeth from one another;

a plurality of toothed-pulleys, said toothed-pulleys having a plurality of rigid teeth formed from a rigid material, said toothed-pulleys being further characterized by the presence of a plurality of grooves which separate the individual teeth of said plurality of rigid teeth, said grooves having bottom and side portions;

means for widening the bodies of the deformable teeth of the toothed-belt, said means being interposed between the tops of the deformable teeth of the toothed-belt and the bottom portion of the pulley grooves; said means for widening the bodies of the deformable teeth of the toothed-belt comprising at least one slot corresponding to the top of each tooth and at least one protuberance cantilevered from the bottom portion of the grooves of the toothed-pulleys' toothing, said protuberance being wedgeable into said slot;

the protuberance cantilevered from the bottom of the groove portion of the toothed-pulleys' toothing having a height equal to the depth of the slot present in the top of each tooth of the toothed-belt, a width of a portion of said protuberance being greater than a width of a portion of said slot with which said protuberance engages when wedged into said slot, said width of said protuberance being defined relative to a radial dimension of said toothed-pulley and said width of said slot being defined relative to a longitudinal dimension of said toothed-belt; and tangents at at least a portion of side portions of the protuberance forming angles with a perpendicular to a radial line of the toothed-pulley, said radial line approximately coinciding with an axis of symmetry of said groove portion of said toothed-pulleys' toothing, values of said angles being greater than a value of a sliding-friction angle between mating surfaces of the toothed-belt's toothing and the toothed-pulleys' toothing.

4. A toothed-belt and toothed-pulley transmission, comprising:

a toothed-belt comprising an annular body of elastomeric material having a tension-resistant structure embedded therein;

a plurality of deformable teeth formed from an elastomeric material, said teeth being cantilevered from one side of the annular body and having a body comprising side, top and bottom portions;

a plurality of grooves separating from one another the individual teeth of said plurality of deformable teeth;

a plurality of toothed-pulleys, said toothed-pulleys having a plurality of rigid teeth formed from a rigid material, said toothed-pulley being further characterized by the presence of a plurality of grooves which separate the individual teeth of said plurality of rigid teeth, said grooves having bottom and side portions;

means for widening the bodies of the deformable teeth of the toothed-belt, said means being interposed between the tops of the deformable teeth of the toothed-belt and the bottom portion of the pulley grooves;

the volume of the space constituting the groove of the toothed-pulley being substantially equal to the volume of the tooth of the toothed-belt destined to be engaged with it, whereby with the insertion of a tooth of the toothed-belt into the groove of the toothed-pulley's toothing, the said interposed means causes a deformation of the tooth of the toothed-belt, such that it is forced to enlarge, thereby bringing into contact practically the entire surface of the tooth of the toothed-belt with the entire surface of the groove of the toothed-pulley.

5. A transmission according to claim 4, wherein the means for widening the bodies of the toothed-belt's teeth presents, corresponding to the top of the tooth of the toothed-belt, at least one cantilevered protuberance, while the toothed-pulley presents a bottom of the groove which is perfectly smooth, whereby the said enlarging of the tooth of the toothed-belt is determined by the squeezing of the said cantilevered protuberance wedged into the body of the tooth of the toothed-belt to come into complete contact with the entire surface of the groove of the toothed-pulley.

6. A transmission according to claim 4, wherein the means for widening the bodies of the toothed-belt's teeth comprises a protuberance cantilevered from the top of the tooth of the toothed-belt, while at the bottom of the groove of the toothed-pulley there is present a housing-slot for said protuberance.

7. A transmission according to claim 6, wherein the height of the protuberance cantilevered from the top of a tooth of the toothed-belt is greater than the depth of the slot present at the bottom of the groove of the toothed-pulley.

8. A toothed-pulley in a transmission with a toothed-belt, comprising a tension-resistant insert, said toothed-pulley comprising:

a toothing comprising a plurality of teeth formed from a rigid material and a plurality of grooves which separate the individual teeth of said plurality of teeth, said grooves having botton and side portions;

means for widening the teeth of the toothed-belt during engagement with said toothing, said means corresponding to the bottom portion of the grooves of said toothing; and the volume of the space constituting the groove of the toothed-pulley being substantially equal to the volume of the tooth of the toothed-belt destined to be engaged with it, whereby after the insertion of a tooth into the grooves of the toothed-pulley, the widening of the teeth of the toothed-belt brings into contact practically the entire surface of the groove of the toothed-pulley without causing stresses in the perpendicular direction of the tension-resistant insert of the toothed-belt.

* * * * *